Feb. 6, 1968  F. J. McDONAL  3,368,191
CONTINUOUS MARINE SEISMIC EXPLORATION WITH MULTIPLE
SUBSURFACE COVERAGE

Filed Dec. 29, 1965  2 Sheets-Sheet 1

3,368,191
CONTINUOUS MARINE SEISMIC EXPLORATION WITH MULTIPLE SUBSURFACE COVERAGE
Frank J. McDonal, Dallas, Tex., assignor to Mobil Oil Corporation, a corporation of New York
Filed Dec. 29, 1965, Ser. No. 517,319
1 Claim. (Cl. 340—7)

This invention relates to marine seismic exploration and, more particularly, to a method of enhancing marine seismic data by obtaining multiple subsurface coverage with a continuous marine exploration system including a repetitive seismic source.

In the art of seismic exploration, there have been various attempts to increase the signal-to-noise ratio on seismic data. The noise includes random noise, such as instrument noise, and coherent noise, such as reverberations, multiples, and ghosts. One of the most successful techniques of reducing random noise and certain types of coherent noise is known as multiple coverage or common depth point (CDP).

In the multiple coverage technique, a seismic source propagates energy downward into the earth and the reflected waves are received by a detector spread comprised of a plurality of detector stations, each having its own separate recording channel. With substantially horizontal subsurface horizons or reflecting interfaces, the reflected energy received at each detector station results from depth points or reflecting elements on various subsurface horizons midway between the source location and the respective individual detector station. Signals or traces recorded from detector stations receiving reflections from the same reflecting elements but with different source-to-detector spacings are called common depth point signals or traces. Each of the CDP traces is first compensated for dynamic and static corrections. Then, the CDP traces are composited to improve the signal-to-noise ratio on the theory that the primary reflections will add in phase and be enhanced, while random noise, rarely being in phase, is attenuated and coherent noise is also attenuated because it usually has a different normal moveout correction than the primary reflections. The number of times that the same subsurface reflecting element is delineated on a seismogram or on separate seismograms is sometimes called the number-of-fold coverage. Thus, in a continuous profiling system wherein the same subsurface is covered four times, the method is referred to as fourfold multiple coverage.

For marine operations there are several problems in obtaining multiple coverage not encountered in land operations. For example, in land operations the geographical location of the seismic energy source and the detector spread remains fixed during a single recording. Then, by various methods of programing and moving the source and detector locations for further recordings, there is obtained multiple subsurface coverage. On the seas, however, the detector spread floating in the water behind the recording boat varies in position according to the roughness of the seas and the strength of the water currents. Furthermore, if the seismic energy source, which may be dynamite, is fired by a separate shooting boat, the position of the source location varies with respect to the detector spread. Usually the recording boat and the shooting boat must slow down to at least a slow trolling rate, during which time the detector spread drifts and the boats vary in position. Attempts to obtain multiple subsurface coverage are frustrated by the varying position of the detector spread with respect to the seismic source location, not to mention the difficulty in recording the correct navigational position of the shooting boat with respect to the detector spread.

In accordance with my invention, multiple subsurface coverage is obtained with a continuous marine seismic exploration system including a repetitive seismic source mounted on a boat and a plurality of hydrophone stations trailing behind the boat, one behind another, in a spread. The seismic source is fired at repetitive time intervals along the exploration traverse for travel of seismic energy downward to a plurality of linear subsurface reflecting elements on various subsurface horizons. The energy reflected from these reflecting elements is then detected at the plurality of hydrophone stations. The separate signal outputs of each of the hydrophone stations, which are representative of the energy received at each of the stations during the time interval between the firing of the seismic source, are then amplified and recorded separately. The boat is maintained at a uniform speed such that the seismic source travels along the traverse a predetermined fixed fraction of the length of the spread between each firing.

After each of the separately recorded signals is compensated for normal moveout, those recorded signals representative of reflected energy from the same subsurface reflecting element but detected at different hydrophone stations are composited to enhance primary reflections and attenuate random and coherent noise.

In a further aspect of my invention, there are provided a method and apparatus for maintaining the recording boat speed uniform along the exploration traverse.

There are further advantages that accrue to the use of my invention. First, multiple coverage data is more rapidly obtained since the recording boat is not required to stop for each firing of the source and subsequent recording of signals. Second, the problem of spread drift is reduced because the boat maintains a forward pull on the spread to offset somewhat the sideways drifting force imparted by the water currents. Third, there is less problem with getting common depth point signals since the seismic source is maintained at the correct distance from the respective common depth point detector station. Finally, the number of fold coverage can easily be varied by adjusting the recording boat speed and the firing interval of the seismic source to the desired amount.

For further advantages and a better understanding of the invention, refer now to the following detailed description and accompanying drawings in which.

Figure 1:
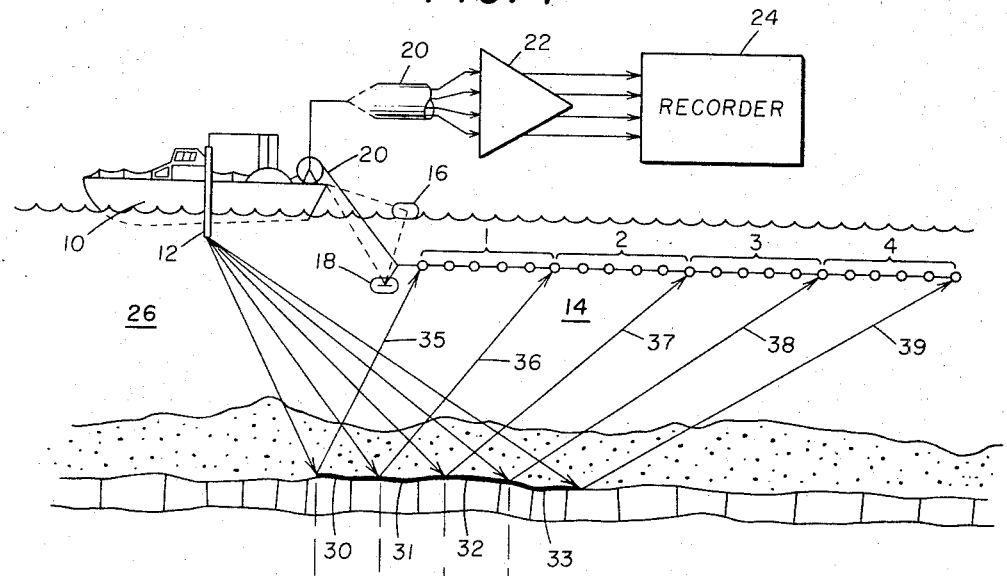
FIGURE 1 illustrates the recording boat, the repetitive seismic source, and the hydrophone spread in one position along an exploration traverse.

Referring now to FIGURE 1, there is illustrated a continuously moving marine seismic exploration system at one point along an exploration traverse. This system includes a recording boat 10 having on board a repetitive seismic source 12. Trailing behind the boat 10 is a hydrophone spread 14 coupled to the boat by surface float 16 and a subsurface vane 18. In the spread of hydrophones 14 there are included a plurality of hydrophone stations arranged one behind the other. Each of the stations, which may each comprise a plurality of individual hydrophones, is connected by way of a separate conductor in cable 20 to the inputs of a four-channel amplifier 22, located on board the boat. A recorder 24 records separately each of the signals detected by stations 1–4.

As seismic surveying begins at a first point along the traverse, the seismic source 12 generates a downward-going wave of acoustic energy for transmission through a water layer 26 to a first group of reflecting elements 30–33. Energy is reflected as by ray paths 35–39 to the hydrophone spread 14 for detection by stations 1–4. Specifically, reflected energy from element 30 is detected by station 1 as indicated between ray paths 35 and 36. Each of the signals received at stations 1–4 is conducted via cable 20 to the four-channel amplifier 22 and then recorded separately in recorder 24.

Figure 2:
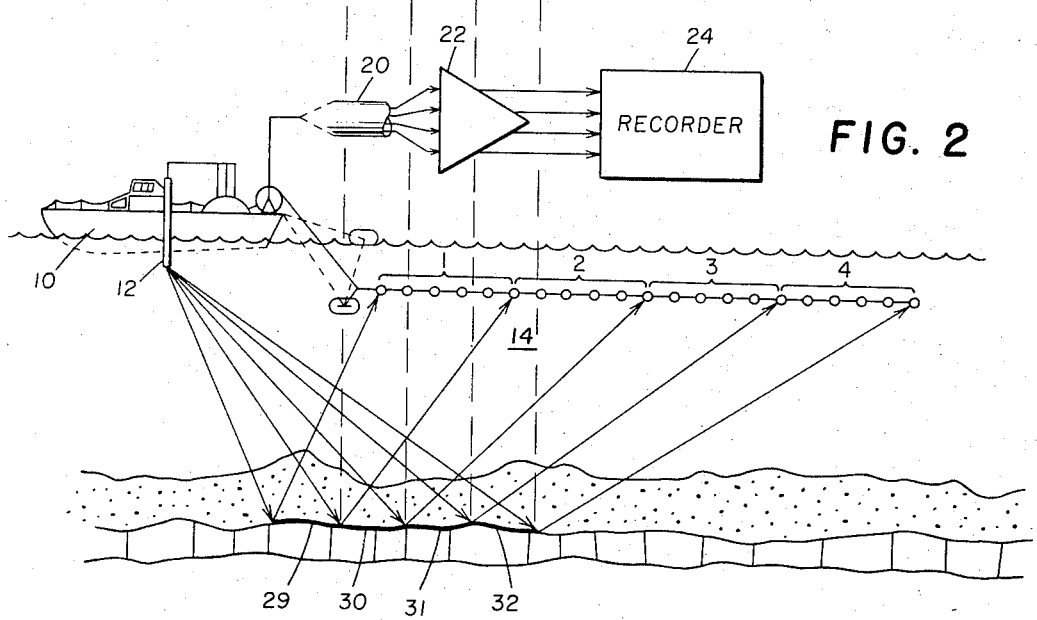
FIGURE 2 illustrates the recording boat, the repetitive seismic source, and the hydrophone spread at a second point along the traverse spaced a distance from the first point of one-half the length of a hydrophone detector station.

Now in FIGURE 2, there is shown at a second instant of time the continuous marine seismic exploration system at a second point along the exploration traverse. The boat 10 has moved up a distance along the traverse equal to one-half the length of one detector station. As will be noted, the distance moved is also equal to the length of one subsurface reflecting element, for example, reflecting element 30. Now when seismic source 12 generates a second downward-going wave, energy is reflected from a second group of reflecting elements 29–32 which includes three elements 30–32 in the first group mentioned above plus an additional element 29. The energy reflected from elements 29–32 is again detected at stations 1–4, amplified in amplifier 22, and recorded separately in recorder 24.

Thus by maintaining a boat speed and a repetitive firing interval such that the boat moves up one-half the length of a detector station between each firing of the seismic source, there is produced fourfold multiple coverage. The boat speed and the firing interval may be determined according to the equation:

$$\frac{1}{2}X = VT\left(\frac{M}{N}\right) \qquad (1)$$

where

X is the total length of each hydrophone station in feet,
V is the velocity of the boat in feet per second,
T is the periodic firing interval of the seismic source in seconds,
N is the number of hydrophone stations,
M is the number of fold coverage desired, and
(M/N) is an integer.

As mentioned previously, an important advantage of my invention is that the number of fold coverage can easily be varied by adjusting the recording boat speed and the periodic firing interval of the seismic source to the proper amount. Consider, for example, where it is desired to obtain fourfold coverage with a hydrophone spread having four separate stations, each with an interval of 200 feet. It is further desired that each recorded signal be about six seconds long. Then from Equation 1 above the velocity of the boat will have to be about four feet per second. By varying the boat speed to another value determined by Equation 1, other values of fold coverage may be obtained. Of course it is obvious that the number of fold coverage cannot exceed the number of traces used in the hydrophone spread.

Figure 3:
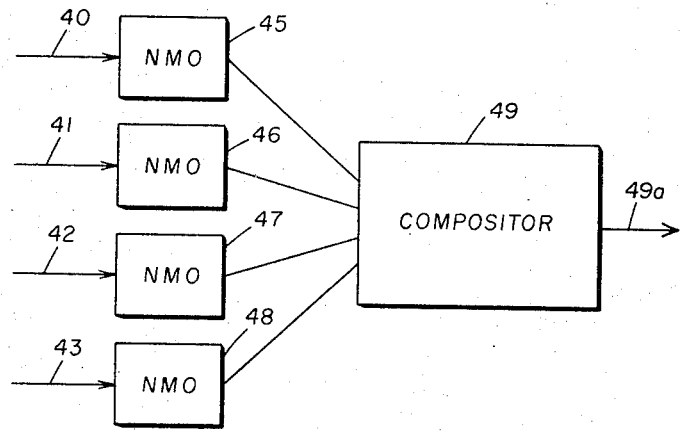
FIGURE 3 is a flow diagram of the process for compositing traces representative of the same subsurface interface.

The process of compositing signals representative of the same subsurface coverage is illustrated generically by the flow diagram of FIGURE 3. For the method of fourfold coverage as was described in connection with FIGURES 1 and 2, the fourfold traces 40–43 are applied to normal moveout correctors 45–48. As well known in the art, the normal moveout corrector adjusts the relative time phase relationships of the signals 40–43 to compensate for variations in the path length, i.e., the difference in horizontal distance between source and detector. The output of normal moveout correctors 45–48 is applied to a compositor 49 where all the common depth point signals are combined to produce a single output signal 49a having enhanced primary events and attenuated noise events. A suitable normal moveout corrector for use in the invention is disclosed in U.S. Patent 3,092,805, issued to Gerard D. Koeijmans, a co-worker of mine.

While there are several continuous marine seismic exploration systems convenient for use in my invention, one particularly suitable is disclosed and claimed in U.S. Patent 3,124,781, issued to George B. Loper, Carroll D. McClure, and Edward B. Simpson, other co-workers of mine. There are disclosed in this patent the means for controlling a recorder of seismic events and a means for firing a repetitive seismic source in coordination with the movement of a recording boat. One repetitive seismic source which may be used with my invention is disclosed and claimed in U.S. Patent 3,058,540, issued to E. B. Simpson. As described, the source comprises an elongated barrel having the muzzle submerged in the water. A combustible gas mixture flows through the source as repeated generation of a spark discharge in the upper end of the source initiates combustion of the gas mixture. As combustion proceeds downward in the detonation chamber, a detonation wave is produced which impacts the water to impart acoustic energy.

Figure 4:
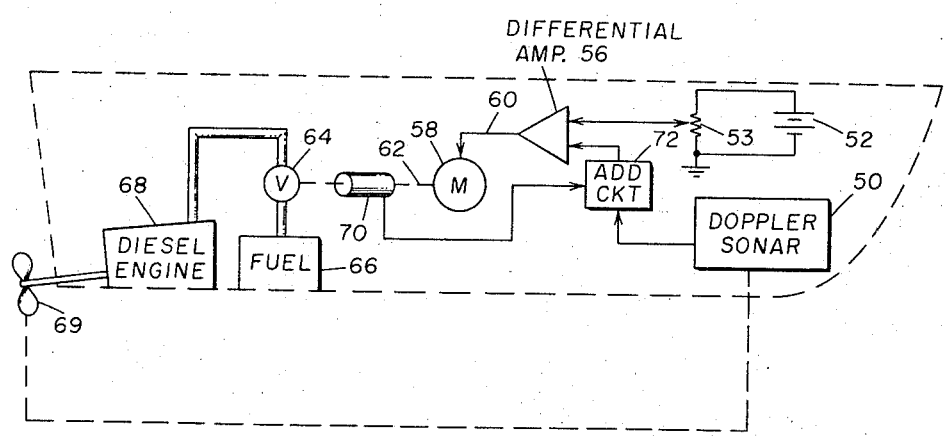
FIGURE 4 is a schematic block diagram of a system for maintaining the boat speed uniform along the traverse.

It is important in the practice of one aspect of my invention that the recording boat be maintained at a uniform speed. A servo control system for maintaining the boat at a uniform speed is illustrated in FIGURE 4. At the heart of the system there is incorporated a Doppler sonar device 50. The Doppler sonar device 50 has an output voltage which is proportional to the true speed of the boat. One Doppler sonar device particularly suitable for use in this invention is described in Technical Proposal P370B and available from the Raytheon Company, Submarine Signal Division, Portsmouth, Rhode Island. Doppler sonar devices of this type operate on the principle that the velocity of a ship may be determined by transmitting sonic waves downward toward the water bottom in several azimuth directions, receiving waves which are reflected back from the ocean bottom, and comparing the frequency of the received waves with the frequency of the transmitted waves. According to the well-known Doppler principle, the difference frequency will vary with the velocity of the ship. Therefore the velocity of the ship may be measured directly in terms of this difference frequency.

The system of FIGURE 4 operates by comparing the Doppler sonar voltage output, which is proportional to the actual speed of the boat, with a reference voltage which is proportional to the desired speed of the boat. More specifically, the voltage output of the Doppler sonar device 50 is applied through an add circuit 72 to the input of a differential amplifier 56. Potentiometer 53, which is connected in parallel across a D-C voltage source 52, is adjusted so that the voltage output appearing across the movable contact arm is proportional to the desired boat speed. The reference voltage appearing across the contact arm of potentiometer 53 is also applied to the input of the differential amplifier 56 which may be of the type D–12 available from the Data Device Corporation, 240 Old Country Road, Hicksville, New York. The differential amplifier operates such that when there is a difference of applied voltages between the reference voltage and the voltage from the Doppler sonar device 50 proportional to true speed, a voltage appears on the output line 60. The difference voltage output of the amplifier 56 then powers a motor 58 which is connected by a shaft 62, or other mechanical connection, to a valve 64 interposed in the fuel line between fuel tank 66 and diesel engine 68. The operation of the motor 68 is such that the valve 64 increases or decreases the flow of fuel to either speed up or slow down diesel engine 68 and thus vary the rotational speed of prop 69. The servoloop is completed when the prop 69 brings the true speed of the boat to be approximately the same as the desired speed of the boat. When this occurs, the output of the Doppler sonar device 50 is equal to the voltage appearing across the movable contact of potentiometer 53. Any difference voltage appearing at the input of the differential amplifier 56 will cause a difference voltage to appear on output line 60 and a resultant rebalancing of the system to bring the true boat speed close to the desired boat speed.

To prevent instability in the servo system, feedback is provided from the output of a D-C voltage generator 70 connected in the mechanical linkage 62 from the motor 58 to the valve 64. The generator 70 generates a D-C voltage proportional to the rate of change of boat speed and this voltage is fed back to the add circuit 72 where it is added together with the output of the changing Doppler sonar voltage.

While the system of FIGURE 3 has shown the control of the boat speed by varying the amount of fuel to the diesel engine powering the boat, it will of course be understood that the same system could be applied to any speed control of the engine or the prime mover powering the boat.

In light of the foregoing description, it may become apparent to those skilled in the art that there can be certain other modifications to the invention. It is intended to cover all such modifications as fall within the spirit and scope of the appended claim.

What is claimed is:

1. The method of obtaining M-fold subsurface coverage with a continuously moving marine seismic exploration system including a repetitive seismic source and a plurality of hydrophone stations arranged in a spread, each of said hydrophone stations being connected in a separate recording channel, comprising the steps of:
    (a) firing said seismic source at repetitive time intervals T for travel of seismic energy downwardly to a plurality of subsurface reflecting elements on various subsurface horizons,
    (b) detecting at N of said plurality of hydrophone stations, each being of length X, the energy reflected from said subsurface elements (where $M/N$ is an integer),
    (c) recording separately signals representative of the energy received at each of said N hydrophone stations during the time intervals between the firing of said seismic source, and
    (d) moving said seismic source at a uniform velocity V such that $$\frac{X}{2} = VT\left(\frac{M}{N}\right)$$

References Cited

UNITED STATES PATENTS

| | | | |
|---|---|---|---|
| 3,124,781 | 3/1964 | Loper et al. | 340—7 X |
| 3,133,262 | 5/1964 | Strange | 340—7 |
| 2,912,671 | 11/1959 | Hayes | 340—3 |
| 3,094,693 | 6/1963 | Taylor | 343—7 |

BENJAMIN A. BORCHELT, *Primary Examiner.*

P. A. SHANLEY, *Examiner.*